United States Patent [19]
Tomerlin

[11] 3,717,941
[45] Feb. 27, 1973

[54] PROBABILITY TEACHING AID

[76] Inventor: Benjamin E. Tomerlin, 214 Augusta Drive, North Syracuse, N.Y. 13212

[22] Filed: Dec. 30, 1971

[21] Appl. No.: 213,924

[52] U.S. Cl. ........................................35/30, 35/9 C
[51] Int. Cl. ..............................................G09b 19/00
[58] Field of Search................35/30, 24 R, 24 C, 9 C

[56] References Cited

UNITED STATES PATENTS

| | | | |
|---|---|---|---|
| 2,838,851 | 6/1958 | Lussar | 35/30 |
| 3,101,555 | 8/1963 | Armand et al. | 35/24 R |
| 3,106,784 | 10/1963 | Raley | 35/9 C |

Primary Examiner—Wm. H. Grieb
Attorney—Bruns & Jenny

[57] ABSTRACT

An electrical probability teaching device has a rotary switch in which a brush contact connected to one side of a battery is rotated over a certain number of contact plates having surface areas proportioned in degrees of arc contacted by the brush according to known areas under the probability curve calculated for that certain number of divisions. Each contact plate is electrically connected through a resistor of a different value through a readout device so that different values of readout are obtained for the various plates on which the brush comes to rest. A checkerboard arrangement of a plurality of pins, arranged in rows and columns, in which each interior pin is connected by like resistors to each of the four pins adjacent to it vertically and horizontally, is used to teach the use of the probability curve in solving problems having two variables. The electrical connection between the battery and the resistors of different value is provided with a male-female connection so that the connectors may be separated and one connected to one of the pins and the other used as a probe in teaching the method of using the probability curve in solving problems.

3 Claims, 7 Drawing Figures

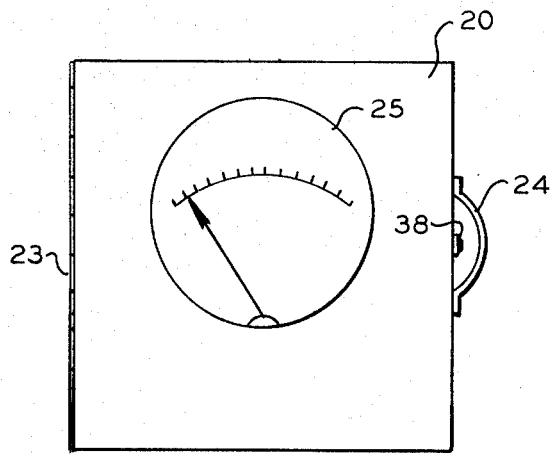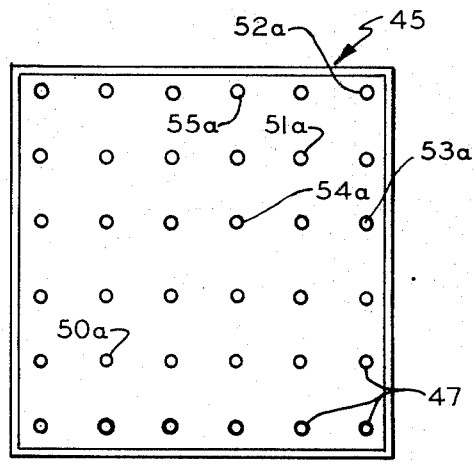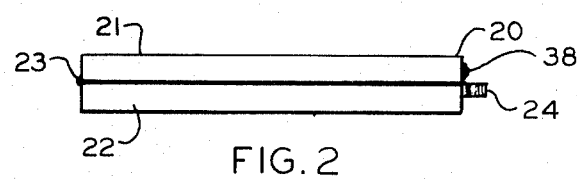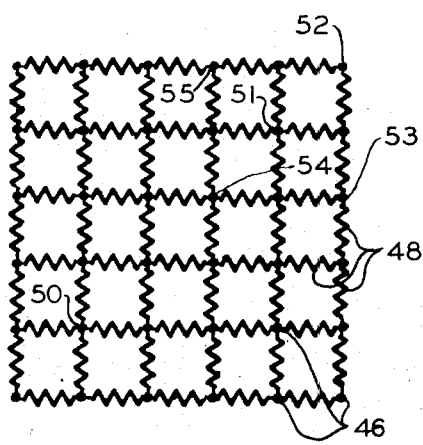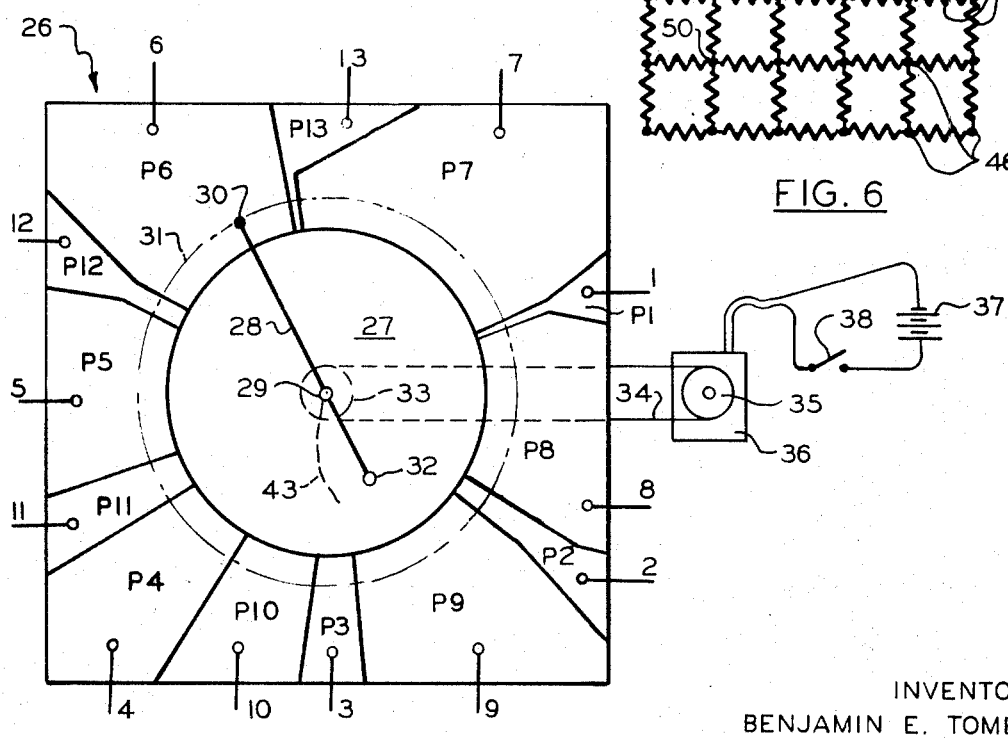

PATENTED FEB 27 1973

PROBABILITY TEACHING AID

BACKGROUND OF THE INVENTION

This invention relates to an electrical device for teaching probability theory and includes a rotary switch in which a brush is rotated in a circular path across a plurality of contact plates, the plates having arcuate contact paths varying in length according to known characteristics of the probability curve.

Prior art devices for teaching probability theory usually comprised mechanical devices having an object such as a ball subjected mechanically to disposition according to chance. The most commonly used is called "Quincunx" and comprises a plurality of beads dropped through a gate and allowed to fall through a triangular shaped pattern of "pin-ball" pins. A series of tubes under the spaces between the longest bottom row of pins receive the beads, the central tubes receiving the most beads and the end tubes receiving the least number of beads.

These devices illustrate the generation of the probability curve generally but are unsatisfactory in failing to demonstrate the interaction of probability theory when two or more variables in a process, for example, are simultaneously changed. Since the problems students encounter in industry usually involve a manufacturing process where more than one variable is changed at each sampling, there is a need for a device illustrating problems in which more than one variable changes for each sampling.

SUMMARY OF THE INVENTION

The present invention uses an electric switch having a rotary brush to activate values shown on a readout device which vary according to the laws of chance. The switch has a plurality of contact plates underlying the path of the brush and the arcuate length of the brush path over the different plates vary according to the various areas under the probability curve divided up in the same number of areas as there are switch contact plates.

One side of a battery is connected through a male-female connector to one terminal of each of a plurality of resistors, the other terminal of each resistor being connected to a different one of the switch contact plates. These other terminals are all connected through a milliammeter to the other side of the battery. Each of the resistors has a different resistance so that each of the switch contact plates is identifiable by a different reading on the meter.

Means are provided for spinning the rotary brush in the manner of a "wheel of fortune". Since the lengths of the arcuate paths of the brush over the contact plates vary, the chances of the brush stopping on the plates with the longer paths is higher than those of stopping on the plates with the shorter paths.

A board is also provided with a plurality of pins arranged in rows and columns, the interior pins comprising all but the pins in the outer rows and columns, being connected by one of a plurality of like resistors to each of the four pins adjacent to it vertically and horizontally. One of the portions of the male-female connector may be connected to a selected pin beneath the board and the other portion of the connector may then be used as a probe to the other ends of the pins to teach the method of applying probability theory to problems having more than one variable and also for illustrating actual problems.

The switch and pinboard and also the necessary batteries are preferably encased in a carrying case of briefcase size so as to be conveniently portable.

BRIEF DESCRIPTION OF THE DRAWINGS

FIG. 1 is a plan view of a teaching aid case according to the invention;

FIG. 2 is a side elevational view thereof;

FIG. 3 is a diagrammatical plan view of the probability switch contained in the case of FIG. 1;

FIG. 5 is a plan view of the pin board contained in the case of FIG. 1;

FIG. 6 is a diagrammatic view of the resistor arrangement on the back of the board of FIG. 5.

DESCRIPTION OF THE PREFERRED EMBODIMENT

Figure 4:
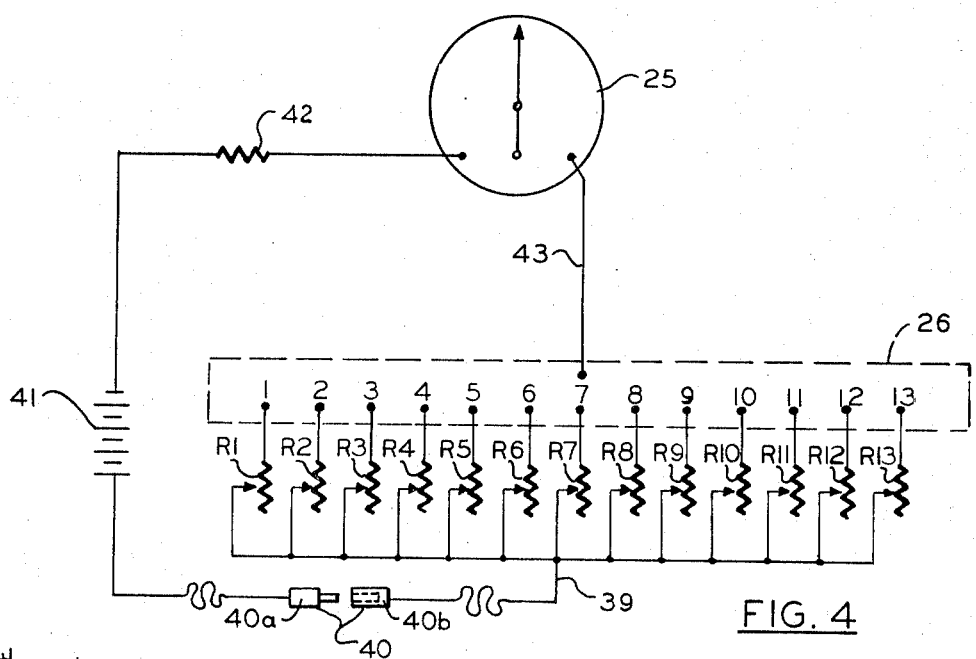
FIG. 4 is a circuit diagram showing the electrical connections to the switch of FIG. 3.

Referring to FIGS. 1 and 2, a case 20 is provided in two halves 21 and 22 hinged together at 23 and provided with the usual locks or snaps, not shown, for locking the case closed. A carrying handle is shown at 24.

The top 21 is also provided with an electrical readout device 25 here shown as a milliammeter. By opening the case and placing it opened on its edge on a table the meter may be viewed by the class.

On the inside of the top or lid 21 a probability switch 26 is secured. The switch comprises a circuit board coated with a conductive material such as copper, the plate being etched in the usual manner, as shown by heavy black lines, to divide it into 13 contact plates P1–P13 varying in size around a central area 27.

A rotary shaft or needle 28 is mounted on an appropriate pivot means 29 at the center of area 27, the shaft 28 having a downwardly projecting contact brush 30 at its longer end so that, as the shaft 28 is rotated, the brush is rotated in a circular path 31 passing over an arcuate portion of each contact plate P1–P13. The other end of shaft 28 is provided with a counterbalance 32 so that brush 30 may be rotated with the least possible friction consistent with making a good electrical contact with each plate.

On the underside of switch 26 the pivot 29 is provided with a pulley 33 connected by a belt 34 to pulley 35 on the drive shaft of a fractional horsepower motor 36. A battery 37 is connected through a pushbutton switch 38 to motor 36 so that, when switch 38 is closed, the brush 30 is rotated in the manner of a "wheel of fortune" to contact successively the portions of the plates in its path. Switch 38 can be conveniently mounted on the case near the handle 24.

The etched lines separating the plates may conveniently be made 1° wide as measured at the circle 31. The plates are sized, as hereinafter more fully described, so that the arcuate path over each plate varies according to the areas of a probability curve divided in 13 areas and brush 30 terminates in a contact wire or point smaller than the 1° width of the etched lines separating the plates. Each plate is electrically connected by a different wire 1-13 attached, as by a drop of solder, to the plate to a different one of a series of resistors R1-R13, each of a different resistance value, mounted in any convenient portion of the case and shown diagrammatically in FIG. 4 on the second sheet of drawings. Resistors R1-R13 are preferably variable resistors so that they may be regulated to give readings on the readout device corresponding exactly to divisions on its scale.

A wire 39 having a common connection to one terminal of each of the resistors R1-R13 is connected through a male-female connector 40, hereinafter described, to one side of a battery 41. The other side of the battery is connected through a circuit limiting resistor 42 through the milliammeter 25 to the switch 26 by means of a wire 43 connected to the pivot 29 of needle 28 and hence to the brush 30.

It will now be apparent that when switch button 38 is pushed and released the needle 28 will be rotated and the chances of its stopping on any one of the plates P1-P13 is proportionate to the arcuate length of the brush path over the plate. The needle may be activated repeatedly before the class and meter readings made and recorded so that the frequency of occurrence of each reading can be recorded and plotted to form a normal distribution curve.

Figure 7:
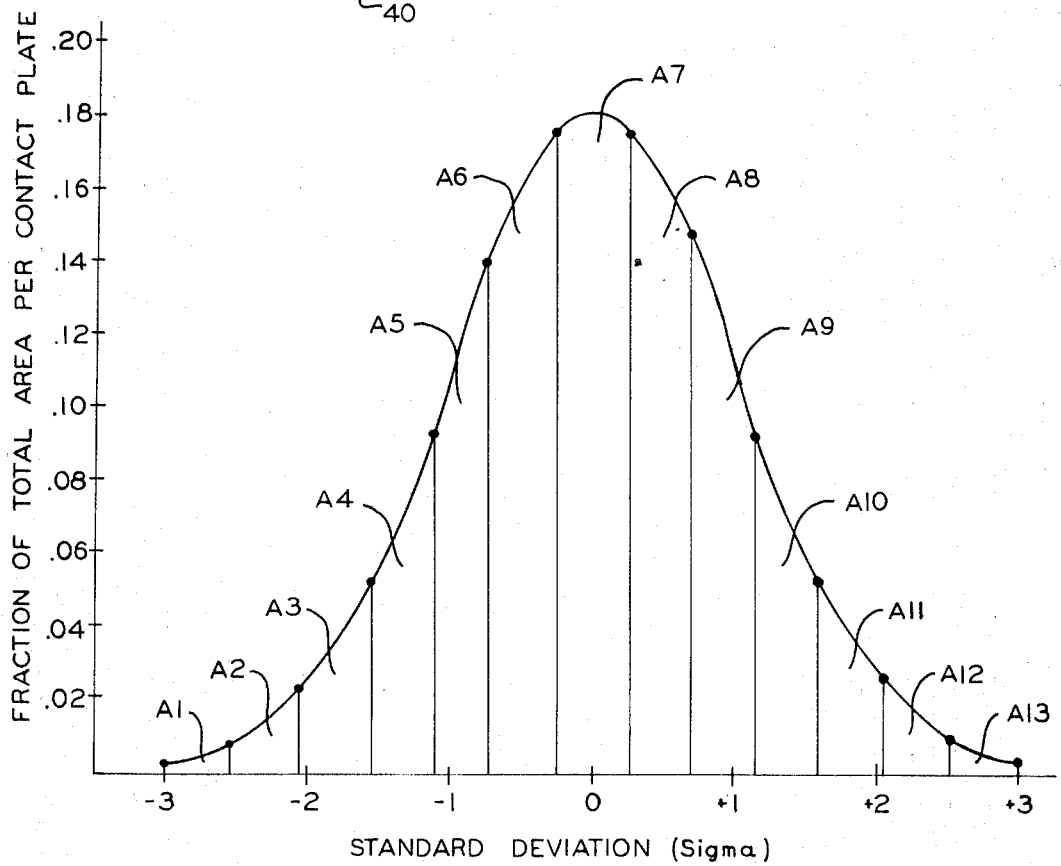
FIG. 7 is a diagrammatic view of a normal probability curve with thirteen areas under the curve.

Such a curve is shown in FIG. 7. The characteristics of such a curve is well known and the calculations for determining the degrees of arc of the brush path may be made from pages 510 and 511, Table A (Areas Under the Normal Curve), Appendix II of "Statistical Quality Control" by E. L. Grant, second edition, published 1952 by McGraw-Hill Book Co., Inc., New York City. Six standard deviations or sigmas, comprising 0.9973 of the curve, may be divided by 13, arbitrarily chosen as a convenient number of contact plates, to obtain 0.4615 standard deviations from −3 to +3 sigma. Fractions of the total area under the curve for each of 13 parts, A1-A13, may be calculated and converted to parts of a 347° arc, 347 being 360° less 13° lost in etching the 10 dividing lines between the contact plates.

Rounding out to the nearest 1/10 degree, this works out to 63.2° of arc corresponding to the center portion A7 of the curve and 57.1°, 41.8°, 24.8°, 11.9°, 4.8°, and 1.5°, respectively, corresponding to the successive adjacent areas on either side, the areas to the right of the center of the curve being plus values and the areas to the left being negative values. These degrees of arc measured along the brush path 31 were used in the switch 26 shown in FIG. 3 but it will be apparent that switches with a different number of contact plates can also be figured in the same manner.

In order that each contact plate may have a different readout value on meter 25, the resistors R1, R2, ... R13 have progressively decreasing resistance values, R1 having the highest resistance and R13 the lowest. The probability of brush 30 ending up on particular plate P1,P2 ... P13 is determined by the comparative arcuate length of the brush path across each plate. The resistors R1,R2 ... R13 are merely for assigning individual meter scale designations to the individual contact plates.

Referring now to FIGS. 5 and 6, on sheet 1 of the drawings a board 45 is provided fitted as a shelf in the bottom portion 22 of the case 20. The board 45 has a series of pins 46 terminating at the upper surface of the board as rivets 47, the pins being arranged in vertical columns and horizontal rows, here shown as six pins in each row and six in each column as shown diagrammatically in FIG. 6. Each pin, except those in the outer rows and columns, is connected by one of a plurality of resistors 48 of like resistance value to the four pins adjacent vertically and horizontally.

The connector 40, shown in FIG. 4, comprises a male portion 40a and a female portion 40b. The instructor can disconnect 40b from 40a and secure it, concealed from the class, to one of the pins 46 shown in FIG. 6 by pressing its socket over the pin, for example pin 50.

The connector portion 40a can then be used as a probe to successively contact the other ends 51a, 52a, 53a, 54a and 55a of the pins without operating the pushbutton switch 38. A different reading on the readout device 25 is obtained for the five pins, the pins farthest away from pin 50 having lower readings than the near pins because the circuits set up by the farther pins include a higher number of resistors 48. The readings on meter 25 are noted and the instructor repeats the probing using pin 54 or 55 as the center pin and noting the meter readings for each. This is usually sufficient for illustrating the method of probing.

Next, the board 45 is used to illustrate the influence of the laws of probability. The board is described as having coordinate values, x and y values, horizontally and vertically representing two variables in a manufacturing process. The instructor, unseen by the class, again selects a pin, pin 50 for example, by seating the connector portion 40b thereon. The students select a starting point, pin 51 for example, and pins 52-55 are again probed successively with the connector portion 40a but, before each probe, the pushbutton 38 is depressed operating the probability switch 26.

If a significantly higher readout for one of the pins is found, the prober can move on to another pin as center. If not, the entire cycle of five readings must be repeated and recorded until a significantly higher total value of readings for one pin is found before moving to another pin as center. The values of the various resistors are chosen so that the variations in the readings caused by the probability switch 26 is usually greater than the variations in readings caused by the probing of adjacent contact pins 46.

The technique for determining when a value is significantly higher is more fully described by George E. P. Box and Norman Draper in their book "Evolutionary Operation: A Method for Increasing Industrial Productivity", published by John Wiley & Son, Inc., New York City. Once found, the pin with the significantly higher total value becomes the center for a new probing cycle of the four pins thereclaround.

The highest possible value, of course, should occur when the probe 40a is directly over the connector portion 40b connected to pin 50. When this point is reached and the total of the readings indicate a significantly higher value for pin 50, the problem has been solved by applying the normal distribution curve to a theoretical industrial problem having two variables. To those skilled in the art it will be apparent that the teaching aid 20 may be used to illustrate process simulation for teaching the use of such industrial applications as process optimization, analysis of variance, linear correlation, curvilinear correlation, and use of control charts.

It will also be apparent that, instead of the ammeter 25, a readout device for showing variations in voltage or resistance may be used. A variable resistance switch between power supply 41 and switch 26 may be added to the circuit of FIG. 4 to change the mean value of 0 sigma in FIG. 7, and hence the shape of the curve, and other variations in the circuit may be made.

I claim:

1. A probability teaching aid, comprising: a switch base rotatably supporting a brush contact, means for briefly rotating the brush contact for more than one revolution in a circular path in contact with a flat surface of the base, the base surface having a selected number of electrically conductive areas under the brush path completely separated by smaller nonconductive areas, the angular length of the arcuate brush paths of the conductive areas being proportionate to the like selected number of areas under the central portion of a normal distribution curve, each conductive area being electrically connected to one terminal of one of a like number of resistors, each resistor having a different resistance value, the other terminal of each resistor having a common electrical connection through a separable connector to one side of a source of electric current, the other side of the source being electrically connected across an electric readout device to the rotatable brush contact, a pin board having a plurality of pins therethrough in a rectangular arrangement of columns and rows, each interior pin being connected to all four of the pins next adjacent to it in its column and row by one of a plurality of like valued resistors, whereby the separable connector can be separated and one connector part secured in electrical contact with one pin and the other connector part used as a probe in contacting the pins successively, the brush contact being briefly rotated before each probe contact of a pin.

2. A probability teaching aid, comprising: a switch base rotatably supporting a brush contact, means for briefly rotating the brush contact for more than one revolution in a circular path in contact with a flat surface of the base, the base surface having a selected number of electrically conductive areas under the brush path completely separated by smaller nonconductive areas, the angular length of the arcuate brush paths across the conductive areas being proportionate to the like selected number of areas under a normal distribution curve from −3 sigma to +3 sigma, each conductive area being electrically connected to one terminal of one of a like number of resistors, each resistor having a different resistance value, the other terminal of each resistor having a common electrical connection to one side of a source of electric current, the other side of the source being electrically connected across an electric readout device to the rotatable brush contact, whereby the brush contact may be frequently rotated and readings noted for laying out a distribution curve.

3. A rotary probability switch comprising: a circuit board having a selected number of electrically conductive contact areas separated from one another by smaller nonconductive areas and arranged about a central area, a rotatable contact arranged to rotate about the central area in a circular path and contacting each conductive area successively in an arcuate path, the arcuate paths varying in length proportionate to the areas of a like selected number of areas under the center portion of a normal distribution curve, means for briefly rotating the rotatable contact for more than one revolution, a power supply having one side connected across an electrical readout device to one side of the switch, the other side of the power supply being connected to the other side of the switch, one side of the switch consisting of an electrical connection to the rotatable contact, and the other side of the switch consisting of a like selected number of resistors having one terminal of each connected to a common connection to the power source and the other terminal of each resistor connected to a different one of the electrically conductive areas, the resistors having different resistance values for giving identifying readout values for each electrically conductive area.

* * * * *